US006419386B1

(12) United States Patent
Fleischli et al.

(10) Patent No.: US 6,419,386 B1
(45) Date of Patent: Jul. 16, 2002

(54) STATIC LAMINAR MIXING DEVICE

(75) Inventors: Markus Fleischli, Zurich; Felix Streiff, Winterthur; Andreas Walder, Dubendorf, all of (CH)

(73) Assignee: Sulzer Brothers Limited, Winterthur (CH)

( * ) Notice: Subject to any disclaimer, the term of this patent is extended or adjusted under 35 U.S.C. 154(b) by 0 days.

(21) Appl. No.: 08/456,001

(22) Filed: May 26, 1995

Related U.S. Application Data

(63) Continuation of application No. 08/205,339, filed on Mar. 3, 1994, now abandoned, and a continuation of application No. 07/740,290, filed on Aug. 5, 1991, now abandoned.

(30) Foreign Application Priority Data

Aug. 23, 1990 (CH) .............................................. 2743/90

(51) Int. Cl.[7] .................................................. G01F 5/06

(52) U.S. Cl. ....................... 366/336; 366/307; 366/325; 239/402

(58) Field of Search ................................ 366/336, 307, 366/325; 237/402, 466; 431/354

(56) References Cited

U.S. PATENT DOCUMENTS 3,770,208 A 11/1973 Mueller ................... 239/417.3
4,073,479 A 2/1978 Kuhn et al. ................. 266/173
4,255,125 A 3/1981 Auclair et al. .............. 431/354
4,590,030 A * 5/1986 Gillner et al. .......... 366/307 X
4,793,957 A * 12/1988 Lovegrove .................. 366/307
4,861,165 A * 8/1989 Fredriksson et al. ........ 366/165
5,044,558 A * 9/1991 Young et al. ............... 431/354

OTHER PUBLICATIONS

Patent application No. 57–15258 filed Feb 1, 1982, Satoru Miyak.*

Patent Abstracts of Japan, vol. 13. No. 224 (C–599) (3572) May 24, 1989 (JPA 62–191274).

Patents Abstracts of Japan vol. 7 No. 248 (C–193) (1393) Nov. 4, 1983.

* cited by examiner

*Primary Examiner*—Patrick Brinson
(74) *Attorney, Agent, or Firm*—Townsend and Townsend and Crew LLP

(57) ABSTRACT

The static laminar mixing device for mixing media of widely different viscosities has two mixers of different cross-sections arranged one after the other with the cross-section of the first mixer being smaller than the second mixer. An admixing device for metering additive of lower viscosity than the medium of the main flow is also provided. This admixing device has a plate which defines a converging orifice for passage of the main flow and additive therethrough into the first mixer while a nozzle is aligned with the orifice for adding the additive flow.

11 Claims, 4 Drawing Sheets

STATIC LAMINAR MIXING DEVICE

This is a Continuation of application Ser. No. 08/205,339, filed Mar. 3, 1994, now abandoned.

This application is a continuation of U.S. Ser. No. 07/740,290, which was filed on Aug. 5, 1991 now abandoned.

This invention relates to a static laminar mixing device and to an admixing device for a static laminar mixing device. More particularly, this invention relates to a static laminar mixing device for mixing media of different viscosities.

Heretofore, various types of static laminar mixing devices have been constructed for the mixing of flowable media. Generally, these devices have been built up of the so-called static mixer elements in which the flow of the media to be mixed, e.g., liquid with liquid or liquid with gas, remains laminar. Laminar mixers of that kind are employed in mixing devices for the mixing of, e.g., liquids of widely different viscosities, such as in the admixing of low-viscosity soluble additives to high-viscosity liquids.

During mixing, the low-viscosity (limpid) liquid is usually fed to the main flow of the high-viscosity (viscid) liquid, e.g., via a tube which may be arranged before or directly at the inlet to the mixer element and opens into the main flow of the high-viscosity liquid.

However, when the viscosities of the liquids to be mixed differ by orders of magnitude (difference $5\times10^3$ to $10^6$ or more), in order to achieve adequate solution and/or thorough mixing, relatively long lengths of mixer are necessary in the mixing devices.

Other mixing devices have also been known for mixing fluids having different viscosities such as described in Japanese Patent Application No. 62-191274 and Japanese Patent Application No. 57-15258. However, the apparatus used for mixing has either been of the conventional static mixer type or of a rather cumbersome convoluted mixer type.

Still other mixing apparatus employing static mixer elements have been known from U.S. Pat. No. 4,255,125, U.K. Patent Application 2,010,739 and French Patent 2,223,073.

Mixing devices wherein an additive is introduced via a nozzle or the like have also been described in U.S. Pat. Nos. 4,073,479 and 3,770,208 as well as German OS 2 320 609.

Accordingly, it is an object of the invention to improve the efficiency of a static laminar mixing device for the mixing of media with different viscosities.

It is another object of the invention to reduce the space required for the mixing of flowable media within static laminar mixing devices.

It is another object of the invention to improve the mixing results of mixing two media of greatly different viscosities.

Briefly, the invention provides a static laminar mixing device which is comprised of a mixer having an inlet for receiving at least a first flow of high viscosity medium and a plurality of static mixer elements disposed along a longitudinal axis thereof for mixing media of different viscosities together and an admixing device for introducing a second flow of low viscosity medium into the inlet of the mixer. This admixing device includes a plate transverse to the flow of the first medium and having at least one convergent orifice therein for passage of the first medium therethrough into the mixer as well as a duct adjacent the plate for passage of the second medium therefrom into the orifice.

The mixing device may also have a second mixer coaxial of the first mixer for receiving media therefrom wherein this second mixer has a cross-sectional area through which the media flow (cross-sectional flow area) is greater than the cross-sectional low area of the first mixer. The second mixer also has a plurality of static mixer elements disposed along a longitudinal axis for receiving and mixing the media of different viscosities together. In this embodiment, the cross-sectional low area of the first mixer is in a ratio relative to the cross-sectional low area of the second mixer of less than or equal to 1:2.

In still another embodiment, the static laminar mixing device may be constructed of two mixers, each of which has a plurality of static mixer elements, as above, with an admixing device of generally conventional structure for introducing the flow of low viscosity medium into the inlet of the first mixer. In this embodiment, the cross-sectional low areas of the two mixers are in a ratio wherein the second mixer is at least twice as large as the first mixer.

With the same total number of mixer elements in two mixers of different cross-sectional low area, the laminar mixing device cannot only achieve a mixing of improved thoroughness but also a considerably improved solution of the admixed liquid or respectively of an admixed gas in a high-viscosity liquid of the main flow.

By way of example, during operation of a conventional laminar mixing device for polystyrene, which exhibits one single mixing column about 1.5 meters (m) long and is provided with thirty mixer elements of SULZER TYPE SMX DN50, only 1 to 2% of mineral oil/paraffin oil additive becomes dissolved in the polystyrene. However, under the same conditions, a laminar mixing device constructed as above with two mixers of different cross-sectional low areas according to the invention, 4 to 6% of the additive may be observed to be dissolved and, in the case of simultaneous employment of the admixing device noted above still more. In this case, the mixing device exhibits a first mixing column, also called the premixer, provided with twelve mixer elements of SULZER type SMX DN17, and a second mixing column, also called the main mixer provided with eighteen mixer elements of SULZER type SMX DN50. The two mixing columns of the mixing device exhibit together a length of merely 1.1 meters (m) with considerably improved, at least doubled admixture of the additive. The number of mixer elements in the first mixing column should be at least four but less than half the total number of mixer elements in the two mixing columns.

The admixing device with the convergent orifice-plate in the main flow of the high-viscosity liquid, which is arranged in the region of the mouth of the feed duct for the low-viscosity medium, can raise the maximum possible homogeneously immiscible amount of the additive or low-viscosity medium by up to about one third in comparison with conventional admixing devices or metering devices. By the introduction of the convergent orifice-plate, there results even in the case of laminar flow conditions an improved solution of smaller drops of the low-viscosity component from the feeder nozzle.

The cross-section of mixing columns is practically always circular and the diameter of the orifice in the likewise appropriately circular orifice-plate should as a rule be at most ⅔ the diameter of the main flow, i.e. of the mixing column.

An admixing device, also called the metering station, may also comprise a number of orifice-plates which are arranged side by side. In this case, a number of orifice-plates with feed ducts for the additive would be distributed over the cross-section of the main flow. The total cross-sectional areas of the several orifice-plate openings should, in this case, advantageously be less than half the cross-sectional areas of the main flow. It has to be ensured that the flow even in the region of the convergent orifice-plates is still laminar.

The employment of the admixing device (metering device) of the kind described is in itself already advantageous in its employment with a mixing column. In combination with an improved laminar mixing device according to the invention, the productive capacity of the metering device becomes particularly effective in support of the increased mixing capacity of the mixing device.

The speeds of flow in the premixer and main mixer lie typically in the range from one to one hundred millimeters per second (mmsec$^{-1}$), for example, from about 50 millimeters per second (mmsec$^{-1}$) in the premixer or 1 to 10 millimeters per second (mmsec$^{-1}$) in the main mixer.

Both with the laminar mixing device alone and with the admixing device alone but particularly in combination, distinctly improved mixing results are achieved. In the admixture of additives, such as mineral oil/paraffin, to and their dissolving in plastics melts such as polystyrene melts, outstanding results are achieved by the mixing device.

These and other objects and advantages of the invention will become more apparent from the following detailed description taken in conjunction with the accompanying drawings wherein.

Figures 1A, 1B:
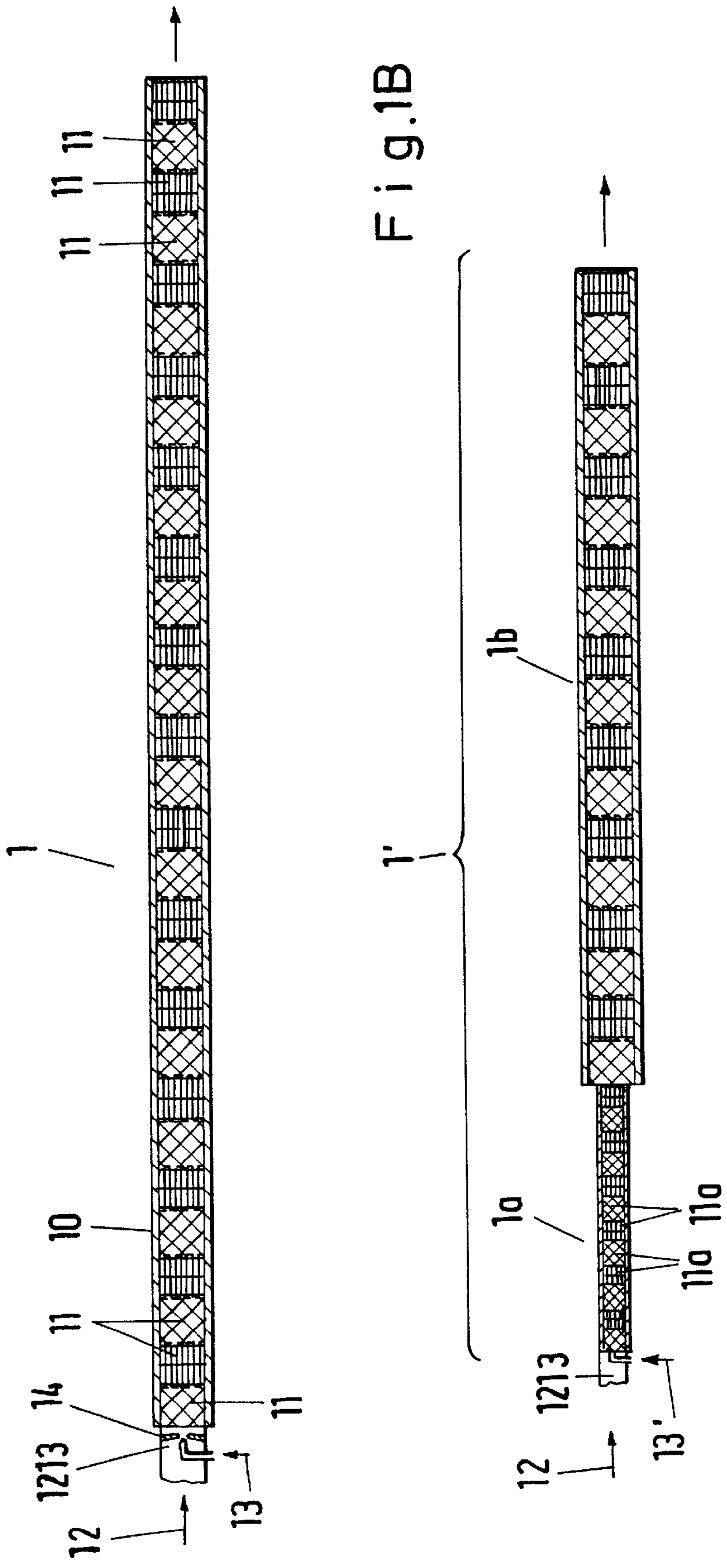
FIG. 1A illustrates a part cross-sectional view of a static laminar mixing device employing an admixing device in accordance with the invention;.
FIG. 1B illustrates a cross-sectional view of a static laminar mixing device employing mixers of different cross-sectional areas in accordance with the invention.

Referring to FIG. 1, the static laminar mixing device is constructed of a mixer 1 of generally conventional structure having a plurality of static mixer elements 11, for example thirty, disposed along a longitudinal axis of a column 10. As indicated, the mixer elements 11 are arranged alternately crosswise to one another. These mixer elements 11 may be of the SULZER type SMX mixer elements. In addition, the mixing device has an inlet at one end to receive a main flow 12 of a high viscosity medium, such as, a plastics. In addition, an admixing device 1213 is disposed at the inlet end of the mixer 1 for introducing a second flow 13 of low viscosity medium, such as a mineral oil/paraffin mixture into the inlet of the mixer 1. This admixing device 1213 includes a plate 14 transverse to the flow 12 of high viscosity medium with a convergent orifice therein for passage of the flow 12 of medium therethrough into the mixer 1. A duct or nozzle 15 is also provided in the admixing device 1213 adjacent to the plate 14 for passage of the second flow 13 of medium into the orifice of the plate 14.

At the outlet from the mixer 1, the additive which has been fed into the main flow 12 is dissolved and/or homogeneously distributed in the main flow of plastics.

The orifice within the plate 14 has a cross-sectional low area equal to at most one-half of the cross sectional area of the main flow 12. Further, the orifice should have a cross-sectional area equal to, at most, two-thirds of the cross-sectional low area of the column 10 of the mixer 1.

Referring to FIG. 1B, wherein like reference characters indicate like parts as above, the mixing device 1' is constructed of a pair of mixers 1*a*, 1*b* which are of different cross-sectional areas from each other. In this case, the first mixer 1*a* functions as a premixer in that the main flow 12 experiences a relatively high shearing action/shear velocity of the order of magnitude $r \approx 20–200\ s^{-1}$ while the second coaxially disposed mixer 1*b* functions as a main mixer 1*b* in which the main flow experiences a relatively low shearing action/shear velocity of the order of magnitude $r \approx 1–5\ s^{-1}$. The mixer 1*a* is armed with, e.g., twelve mixer elements 11*a* arranged crosswise. The mixer 1*b* comprises, for example, eighteen mixer elements 11*b*, likewise arranged crosswise. The low-viscosity medium/additive 13' (e.g., paraffin oil) is admixed in the admixing device or metering device 1213' to the main flow 12' of the viscid medium (e.g., a plastics such as polystyrene). Instead of the admixing device represented as conventional, an admixing device having a metering device with an orifice-plate may be provided. Conceivably, a transfer piece with a transfer segment without mixer elements may be arranged between the two mixers 1*a* and 1*b* of the mixing device 1'.

As compared with a conventional mixing device, with the mixing device 1' of FIG. 1B, it is possible, e.g., with practically the same dwell time though at a higher drop in pressure (about 62 bar as compared with about 36 bar) to admix over a shorter segment approximately double to triple the amount of additive and dissolve the additive in the main stream.

Figure 2:
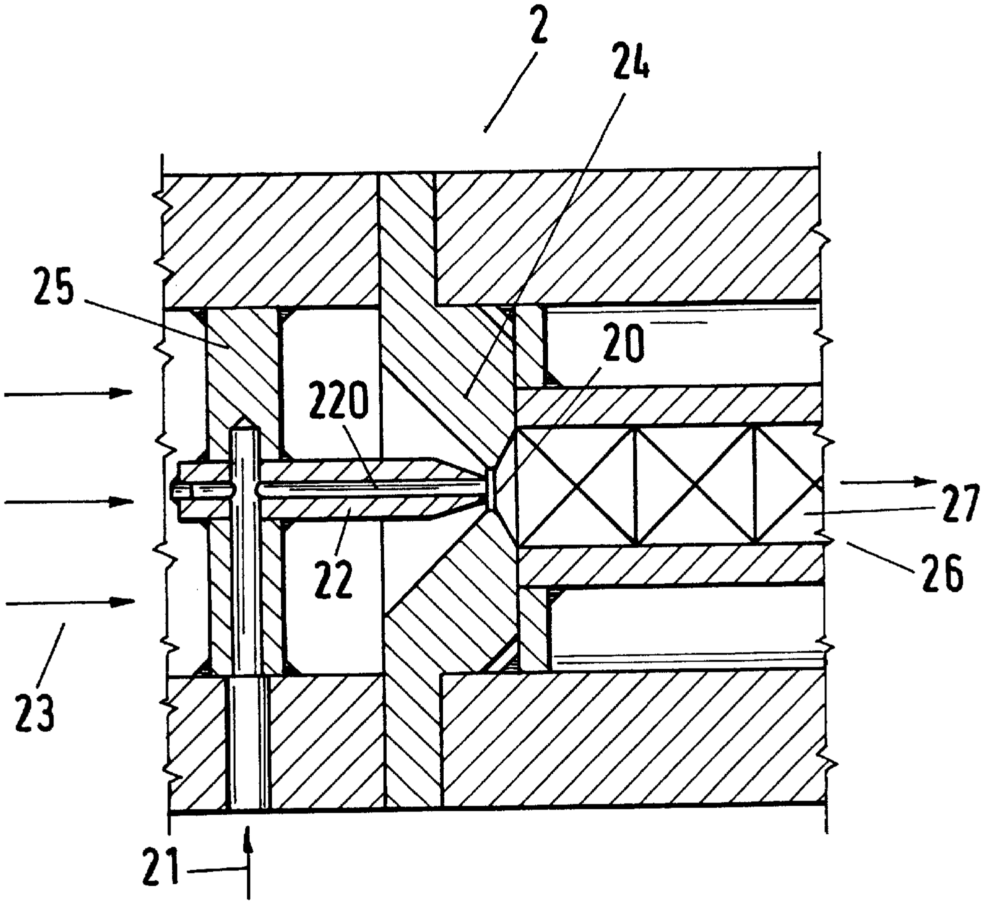
FIG. 2 illustrates a cross-sectional view of an admixing device constructed in accordance with the invention.

Referring to FIG. 2, the admixing or metering device 2 is constructed so as to deliver an additive flow 21 via a duct in the form of a nozzle 22 having a central nozzle channel 220 into the main flow 23 in the region of an opening 20 in an orifice plate 24. The feed of the additive 21 is effective from the side to the nozzle 22 which is mounted in a web 25 transverse to the main flow 23. As indicated, the nozzle channel 220 and the orifice plate opening 20 open directly into a mixer 26 having a plurality of mixer elements 27 as described above.

As shown in FIG. 2, the plate 24 has a convergent orifice leading to the opening 20 while the nozzle 22 has an outer conical surface within the orifice of the plate 24. In this embodiment, the outlet of the nozzle 22 terminates immediately upstream of the opening 20 provided by the orifice plate 24. In addition, the plate 24 diverges conically on the downstream side of the opening 20 to a diameter equal to the outer diameter of the mixing elements 27 of the mixer 26.

Figure 3:
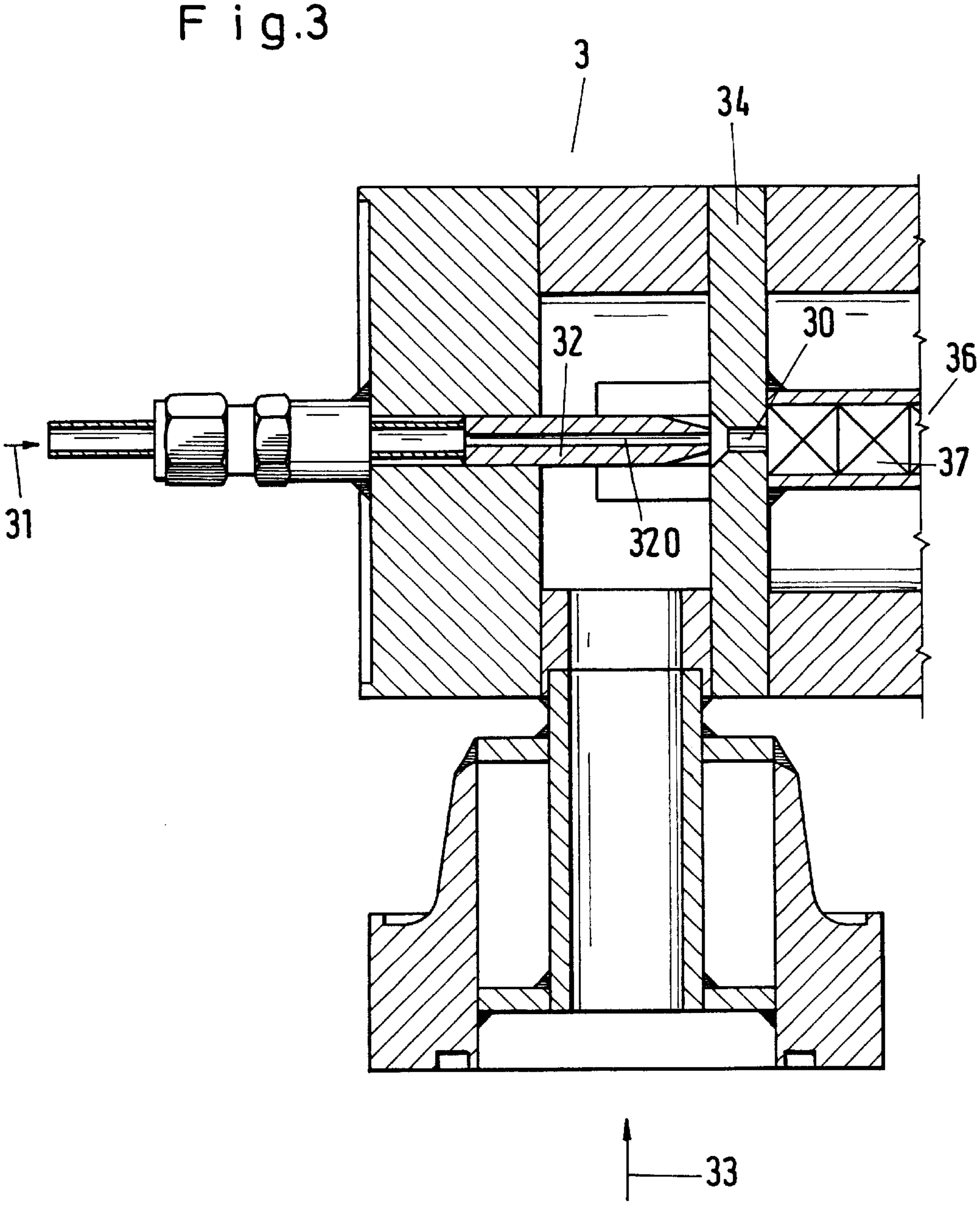
FIG. 3 illustrates a cross-sectional view of a modified admixing device constructed in accordance with the invention.

Referring to FIG. 3, the admixing or metering device 3 may be constructed so that the main flow 33 of the viscid component is deflected and fed into a mixer 36 having a plurality of mixer elements 37 via a channel-like opening 30 in an orifice plate 34. In this embodiment, the more limpid additive flow 31 is not deflected but, instead, is directed via a nozzle 32 having a nozzle channel 320 in the direction of the mixer 36.

As illustrated in FIG. 3, the nozzle 32 terminates immediately upstream from the convergent orifice of the plate 34 and is provided with an outer conical surface. In this case, the main flow 33 flows about the nozzle 32 and then passes over the nozzle 32 into the convergent orifice of the plate 34 before passing through the channel-like opening 30 and, thence, into the mixer 36. At the same time, the additive 31 is directed from the nozzle 32 into the convergent orifice of the plate 34 for admixing with the main flow.

Figure 4B:
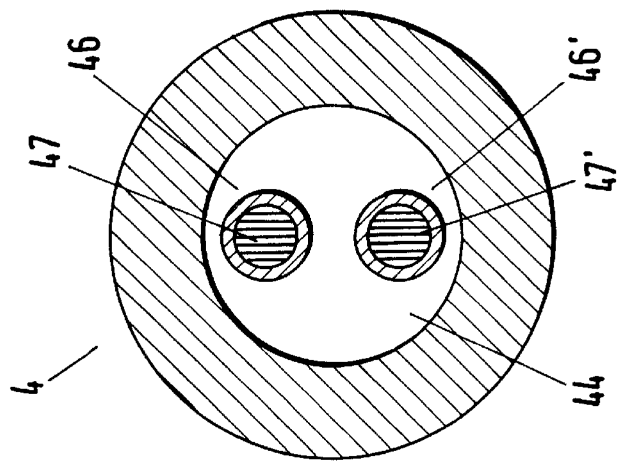
FIG. 4B illustrates a view taken on line IVB—IVB of FIG. 4A.
Figure 4A:
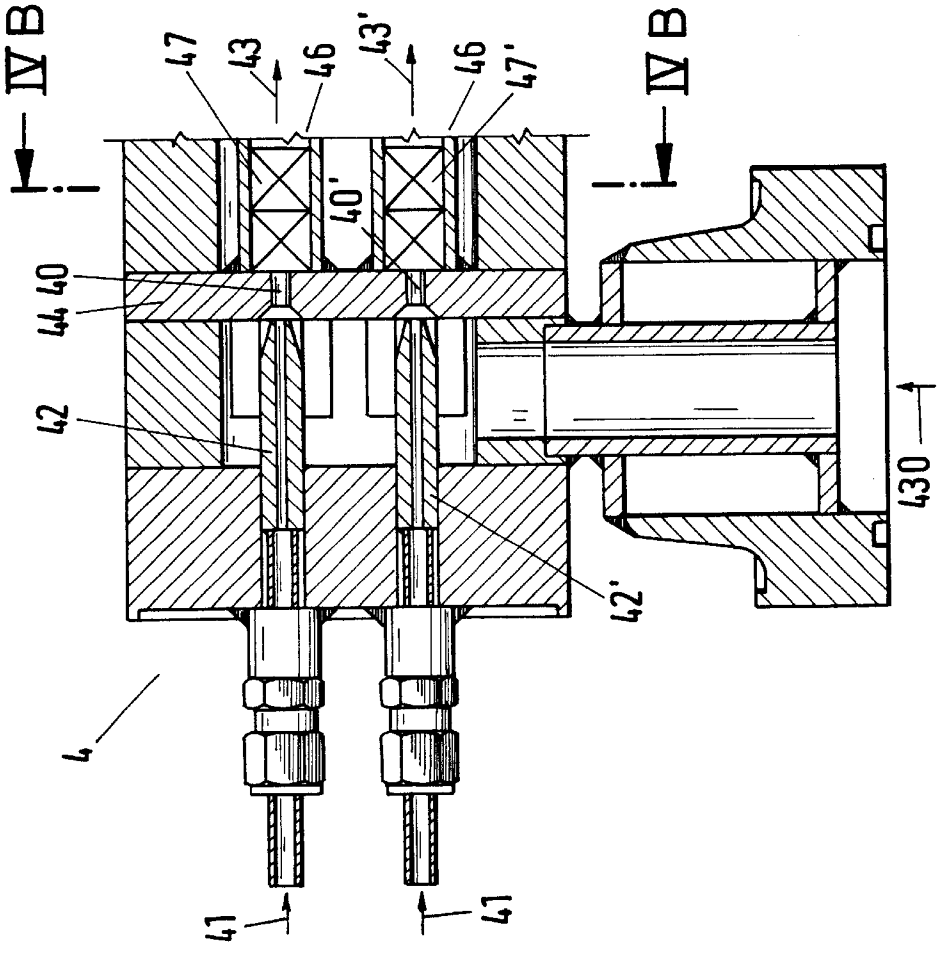
FIG. 4A illustrates a cross-sectional view of a modified admixing device in accordance with the invention having a plurality of orifices in an orifice plate.

Referring to FIGS. 4A and 4B, the admixing or metering device may be constructed with two nozzles 42, 42' for the additive 41 while the plate 44 has a pair of convergent orifices aligned with the nozzles 42, 42' in order to divide a main flow 430 of high viscosity medium into two parallel partial main flows 43, 43' which flow through respective mixers 46, 46' provided with mixer elements 47, 47', respectively. As above, the orifice plate 44 has a pair of openings 40, 40', extending from the convergent portions of the orifices.

The mixers 46, 46' are disposed in parallel and may be constructed to form a premixer for a common main mixer along the lines as indicated in FIG. 1B.

During operation of a mixer device having an admixing or metering device as shown in FIGS. 3 to 4B, a. first flow of high viscosity medium is directed through a convergent orifice of a plate transverse to the flow and into a mixer having a plurality of static mixer elements disposed along the longitudinal axis. At the same time, a second flow of low viscosity medium is introduced into the convergent orifice for passage into the mixer. For example, the flows of medium may have a difference in viscosity relative to each other in a range of orders of magnitude of from $5\times10^2$ to $5\times10^7$. Subsequently, the mixture of the two flows of medium can be directed into a second mixer which has a plurality of static mixer elements therein and which is of a cross-sectional low area greater than at least twice the cross-sectional low area of the first mixer.

During operation of an embodiment such as shown in FIG. 1B, a conventional admixing device may be used for directing at least two flows of media of different viscosities into the premixer 1*a* with the media thereafter passing into the main mixer 1*b*.

The low-viscosity additives which may be introduced into a main flow may also be in the form of a gas, for example, nitrogen, carbon dioxide or water vapor.

The invention thus provides a static laminar mixing device which is able to admix greater quantities of additives into a main flow than previously known constructions. In addition, the invention provides an admixing device of relatively simple construction for introducing an additive into a main flow of high viscosity medium in an efficient manner.

Still further, the invention provides a static laminar mixing device which can be constructed in a compact manner within a reduced amount of space as compared with previously known static laminar mixing devices.

What is claimed is:

1. A static laminar mixing device comprising a plate disposed transversely of a first flow of flowable medium, said plate having at least one convergent orifice for passage of the first flow of medium therethrough;

a duct coaxial of said orifice of said plate for expelling a second flow of flowable medium into said convergent orifice for mixing with the first flow downstream of said plate;

a first mixer having a predetermined cross-sectional flow area, an inlet for receiving said first and second flows, and a plurality of static mixer elements disposed along a longitudinal axis thereof; and a second mixer connected with said first mixer for receiving media therefrom, said second mixer having a cross-sectional flow area that is greater than said cross-sectional flow area of said first mixer, wherein said cross-sectional flow areas of said first and second mixers are taken generally perpendicular to the direction of flow through said respective mixers, said second mixer including a plurality of static mixer elements disposed along a longitudinal axis thereof.

2. A static laminar mixing device as set forth in claim 1 wherein said duct extends into said orifice of said plate.

3. A static laminar mixing device as set forth in claim 2 wherein said duct has an outer conical surface within said orifice of said plate.

4. The static laminar mixing device of claim 1, wherein said second mixer is coaxial of said first mixer.

5. A static laminar mixing device comprising a first mixer having a predetermined cross-sectional flow area, an inlet for a flow of a high viscosity medium and a plurality of static mixer elements located along a longitudinal axis of the first mixer;

an admixing device for introducing a flow of a low viscosity medium into the first mixer; and a second mixer in flow communication with a downstream end of the first mixer for receiving the flows from the first mixer, the second mixer having a substantially constant, cross-sectional flow area over its length which is greater than the cross-sectional flow area of the first mixer, the second mixer including a plurality of static mixer elements serially arranged between an inlet and an outlet of the second mixer for mixing the received media.

6. A static laminar mixing device comprising a first mixer defined by an elongated first tubular conduit having an inlet, an outlet and a plurality of static mixer elements serially arranged along a longitudinal axis of the first tubular conduit for mixing media having different viscosities, the first tubular conduit having a given cross-section defining a cross-sectional flow area therethrough, the static mixer elements extending across the entire cross-sectional flow area;

an admixing device for introducing a second flow of a low viscosity medium into the first tubular conduit; and a second mixer defined by an elongated, second tubular conduit having an inlet in flow communication with the outlet of the first tubular conduit, an outlet and a cross-section which is greater than the given cross-section, and a plurality of static mixer elements arranged longitudinally over a length of the second conduit and extending across the entire cross-sectional area of the second conduit so that a cross-sectional flow area for the media through the mixer elements in the second conduit is greater than the cross-sectional flow area for the media through the first conduit.

7. A static mixer according to claim 6 wherein the first conduit has a constant cross-section over its entire length.

8. A static mixer according to claim 6 wherein the second conduit has a constant interior cross-section over its entire length.

9. A static laminar mixing device comprising first and second tubular mixing conduits joined end-to-end for axially flowing fluid media to be admixed from an inlet of the first conduit to an outlet of the second conduit, the first and second conduits having first and second cross-sectional flow areas bounded by interior wall surfaces of the respective conduits which are substantially constant over respective lengths of the conduits, the second cross-sectional flow area being greater than the first cross-sectional flow area, a plurality of first and second static mixing elements serially arranged over the lengths of the first and second conduits, respectively, each static mixing element extending transversely to the axes of the conduits over the entire cross-sectional flow area of the respective conduits; and means for introducing the fluid media to be mixed into the first housing upstream of the second housing.

10. A static laminar mixing device according to claim 6 wherein the cross-sectional flow area for the media through the mixer elements in the second conduit is greater than the cross-sectional flow area for the media through the first conduit over the entire length of the second conduit.

11. A static laminar mixing device comprising a first mixer having a predetermined cross-sectional flow area, an inlet for receiving at least a first flow of high viscosity medium, and a plurality of static mixer elements disposed along a longitudinal axis thereof for mixing media of different viscosities together;

an admixing device for introducing a second flow of low viscosity medium into said inlet of said first mixer; and a second mixer connected with said first mixer for receiving media therefrom, said second mixer having a cross-sectional flow area that is greater than said cross-sectional flow area of said first mixer, wherein said cross-sectional flow areas of said first and second mixers are taken generally perpendicular to the direction of flow through said respective mixers, said second mixer including a plurality of static mixer elements disposed along a longitudinal axis thereof for receiving and mixing the media of different viscosities together; wherein the cross-sectional flow area of the second mixer is greater than the cross-sectional flow area of the first mixer over the entire length of the second mixer.

* * * * *